(12) United States Patent
Fleming et al.

(10) Patent No.: US 10,537,839 B1
(45) Date of Patent: Jan. 21, 2020

(54) LOW PRESSURE DROP ADVANCED SWIRL TECHNOLOGY GAS FILTER

(71) Applicant: National Technology & Engineering Solutions of Sandia, LLC, Albuquerque, NM (US)

(72) Inventors: Darryn Fleming, Albuquerque, NM (US); Salvador B. Rodriguez, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/825,852

(22) Filed: Nov. 29, 2017

(51) Int. Cl.
| | |
|---|---|
| *B01D 45/06* | (2006.01) |
| *F01K 21/06* | (2006.01) |
| *F01K 7/16* | (2006.01) |
| *F01K 25/10* | (2006.01) |
| *F02C 1/04* | (2006.01) |
| *F02C 1/10* | (2006.01) |
| *F02C 7/05* | (2006.01) |
| *F02C 7/052* | (2006.01) |

(52) U.S. Cl.
CPC ............... *B01D 45/06* (2013.01); *F01K 7/16* (2013.01); *F01K 21/06* (2013.01); *F01K 25/103* (2013.01); *F02C 1/04* (2013.01); *F02C 1/10* (2013.01); *F02C 1/105* (2013.01); *F02C 7/05* (2013.01); *F02C 7/052* (2013.01)

(58) Field of Classification Search
CPC . B01D 45/06; F02C 7/052; F02C 7/05; F02C 1/04; F02C 1/10; F02C 1/105; F01K 21/06; F01K 7/16; F01K 25/103

USPC ................... 60/646, 650, 657, 659, 682–684
See application file for complete search history.

(56) References Cited

U.S. PATENT DOCUMENTS

| | | | | |
|---|---|---|---|---|
| 2,392,623 A | * | 1/1946 | Traupel | F02C 1/10 |
| | | | | 60/684 |
| 9,624,793 B1 | * | 4/2017 | Pasch | F01K 7/16 |
| 9,745,899 B2 | * | 8/2017 | Wright | F02C 9/00 |

(Continued)

OTHER PUBLICATIONS

Rodriguez, Sal; Swirling Jets for the Mitigation of Hot Spots and Thermal Stratification in the VHTR Lower Plenum; PhD diss.; 2011; University of New Mexico.

(Continued)

*Primary Examiner* — Hoang M Nguyen
(74) *Attorney, Agent, or Firm* — Daniel J. Jenkins

(57) ABSTRACT

A media-free filter device for a supercritical fluid process is disclosed. The media-free filter device includes a first pipe section connected in flow communication with a closed-loop system for a supercritical fluid. A y-pipe segment intersects the first pipe section at an intersection joint. The intersection joint intersects at a descending obtuse angle with respect to the first pipe section flow direction. The y-pipe segment is open at the intersection joint and closed opposite the intersection joint, in flow communication with the first pipe section. The y-pipe section induces an eddy current turbulence zone adjacent the intersection joint to remove substantially all contaminants suspended in the supercritical fluid; and the contaminants are deposited in the descending y-pipe segment. An SCO2 process incorporating the media-free filter device is also disclosed.

18 Claims, 4 Drawing Sheets

(56) References Cited

U.S. PATENT DOCUMENTS

2007/0175457 A1* 8/2007 Lyons .................... F02M 26/14
123/568.12
2009/0000275 A1* 1/2009 Zielke .................. F01N 3/0231
60/278
2013/0101471 A1* 4/2013 Yacoub .................. F01N 3/103
422/168

OTHER PUBLICATIONS

Stayflow; Pressure Drop Chart, Flanged "Y" Strainers; Stayflow Strainers Technical Data; 2010.

* cited by examiner

LOW PRESSURE DROP ADVANCED SWIRL TECHNOLOGY GAS FILTER

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to a media-free filter device for supercritical fluid processes. The application relates more specifically to a Y-pipe configuration for removal of contaminants entrained in supercritical fluid, with negligible pressure loss.

Supercritical carbon dioxide systems are known for use in chemical processes. Supercritical fluid refers to fluid that is above a critical temperature and pressure (e.g., at or above 31° C. and 1070 pounds per square inch absolute (psia) respectively, for carbon dioxide). Supercritical fluids have both gaseous and liquid properties. The density of supercritical fluids can be varied as a function of temperature and pressure. The solvating properties can also be varied.

Certain chemical processes, e.g., semiconductor applications, can contaminants with vapor pressures either above or below that of carbon dioxide. The lighter, higher vapor pressure components may include combination of fluorine, light fluorinated hydrocarbons and atmospheric gases such as nitrogen and oxygen. The carbon dioxide may be contaminated with non-volatile resist residue compounds and co-solvents, which are difficult to transfer because they can exist as a solid/liquid mixture in combination with vapor phase carbon dioxide. Also, carbon dioxide purity requirements for many semiconductor manufacturing applications exceed those of currently available delivered bulk carbon dioxide.

Advanced power cycles, e.g., supercritical $CO_2$ closed loop processes experience operational problems with contaminants due to the high mass flow rates which transport contaminate through the loop. These contaminants cause material degradation throughout the loop and cannot be easily filtered, because most $sCO_2$ systems cannot function properly with high pressure drop through a filter medium. In fluid dynamics, vortex shedding is an oscillating flow that takes place when a fluid flows past a bluff—as opposed to streamlined—body at certain velocities, depending on the size and shape of the body.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a media-free filter device for a supercritical fluid process. The media-free filter device includes a first pipe section connected in flow communication with a closed-loop system for a supercritical fluid. A y-pipe segment intersects the first pipe section at an intersection joint. The intersection joint intersects at a descending obtuse angle with respect to the first pipe section flow direction. The y-pipe segment is open at the intersection joint and closed opposite the intersection joint, in flow communication with the first pipe section. The y-pipe section induces an eddy current turbulence zone adjacent the intersection joint to remove substantially all contaminants suspended in the supercritical fluid; and wherein the contaminants are deposited in the descending y-pipe segment.

Another embodiment relates to a closed loop SCO2 process that is without a media filter. The process includes a heater in flow communication with a process SCO2 fluid to heats the fluid to supercritical parameters for input into a turbine. The process SCO2 fluid flows first through a y-pipe filter. A recompressor, a main compressor, a high temperature (HT) recuperator and a low temperature (LT) recuperator are also connected in the closed process loop. The SCO2 is in flow communication with the turbine flowing from turbine to an input of the recompressor and into the main compressor. A gas cooler feeds cooled gas to the main compressor. The recompressor recirculates a portion of the process SCO2 fluid to the high temperature (HT) recuperator at a junction, in serial flow communication with the low temperature (LT) recuperator. The main compressor discharges process SCO2 fluid to the LT recuperator. The turbine discharges a portion of SCO2 fluid to HT recuperator in a reverse path to LT recuperator. The HT recuperator discharges in a forward path to heater inlet and thence to the y-pipe filter at an inlet to turbine. The HT recuperator discharges in a forward path to heater inlet and thence to the y-pipe filter at an inlet to turbine.

One advantage is the ability to achieve both low pressure drop and contaminant filtration through a filter that uses swirl technology.

Another advantage is the use of the swirl technology in a y-pipe trap to replace media filters, which create pressure drops and reduce system efficiency.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
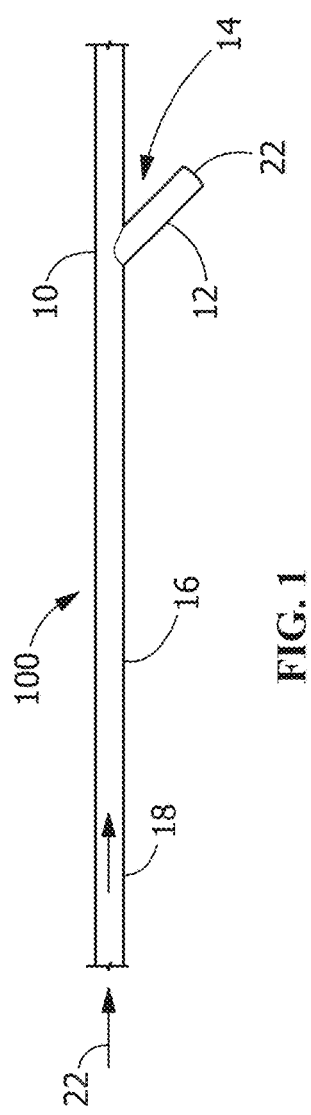
FIG. 1 shows an exemplary primary pipe section for a process fluid, e.g., sCO2, in a closed loop piping system of the disclosure.

Referring to FIG. 1, a process fluid, e.g., sCO$_2$, in a closed loop piping system (See, e.g., FIG. 6) includes a primary pipe section 100. Primary pipe section 100 includes a straight pipe section 16 connected with Y-trap portion, or offset fixture, 10 (FIG. 2) in fluid communication with pipe section 16. Process fluid, indicated by arrow 18, flows through offset fixture 10 in pipe section 100. Offset fixture 10 includes a 45° angle descending section 12 at intersection 14 in straight pipe section 16. Descending section 12 is closed at one end 22. The flow of process gas 18 acts in a vortex shedding behavior causes swirling of the gas.

A swirling eddy is produced in the process gas 18 adjacent intersection 14 and contaminants entrained in the current are trapped in descending section 12. Contaminants having a density higher than the process gas are ultimately trapped in the eddy current generated by contact with angular edge 20 formed at intersection 14 of the descending angle portion 12 in flow communication with the straight pipe section 16.

In one exemplary embodiment a supercritical carbon dioxide (SCO2) fluid having a density of 120 kg/m3, dynamic viscosity of 5.5×10$^{-5}$ kg/m-s, 810 K (1,000° F.), and 1.75×10$^7$ Pa (2,500 psi) flows through a closed loop straight pipe section. Pipe section 100 may be, for example, 3-inch schedule 160 pipe having an inside diameter of 0.0667 m, and SCO2 fluid corresponds with a mass flow rate of 7.0 kilograms per second (kg/s) or 924.7 gallons per minute (gal/min). The fluid. SCO2 is turbulent having a Reynolds number at 2.4×10$^6$, and mean turbulence velocity of 16.7 m/s. In order to reach fully developed flow, the primary main stream pipe section 18 extended to 40 pipe diameters, with a 45° y-trap located at approximately 32 pipe diameters from the main pipe section inlet 22.

Figure 2:
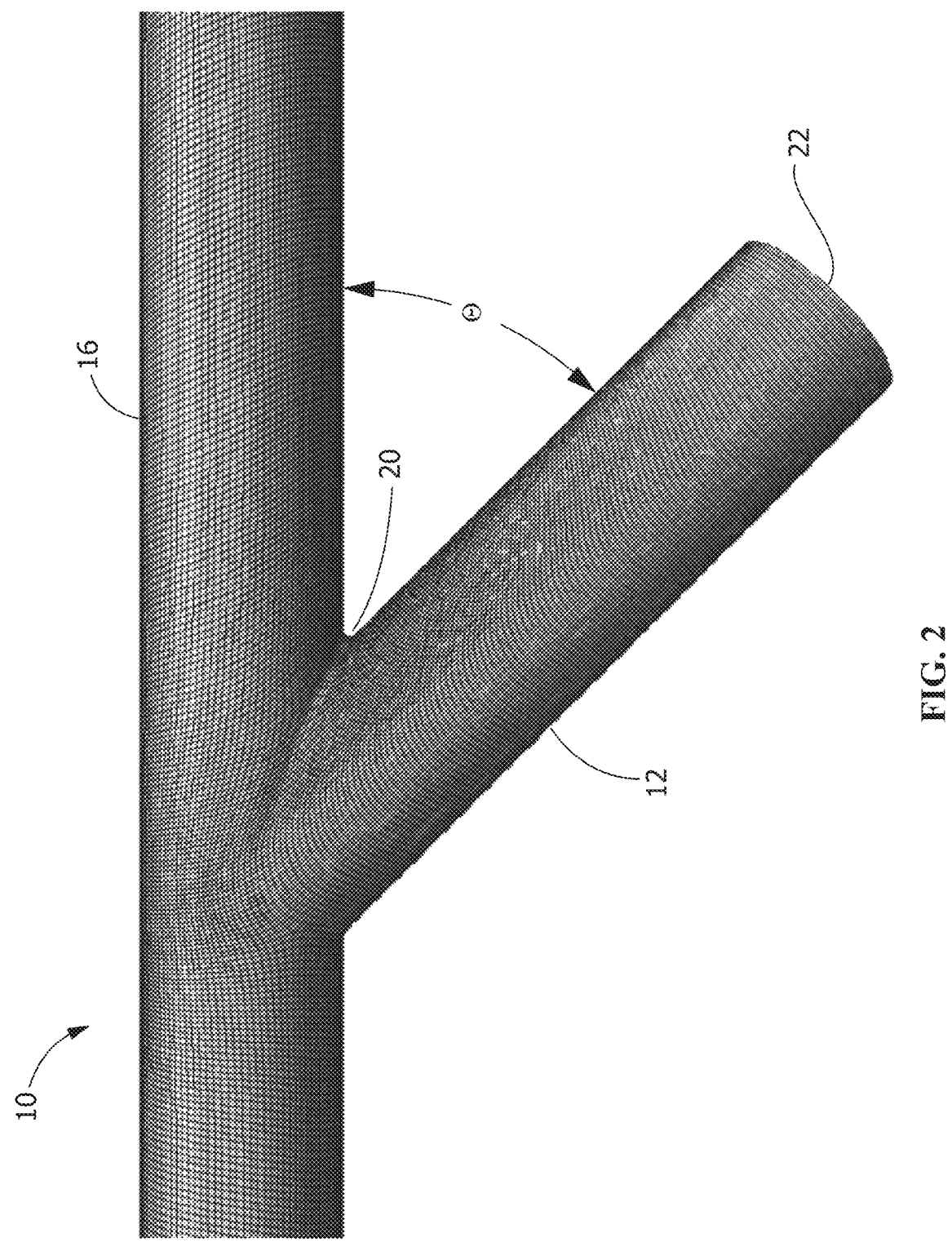
FIG. 2 shows an exemplary an enlarged sectional view of the y-trap of FIG. 1.

FIG. 2 shows an enlarged sectional view of the y-trap 10, including a mesh representation of fluid velocity. Note that the somewhat concave appearance at the intersection 20 is due to the orientation of mesh elements and not an actual physical geometry. Based on velocity fluctuations, the peak fluid velocity reached 20.9 m/s. Based on the foregoing parameters, the integral eddy size was approximately 4.7×10−3 m, and the smallest eddies, i.e., the Kolmogorov eddies, were 1.4×10−5 m.

Figure 4:
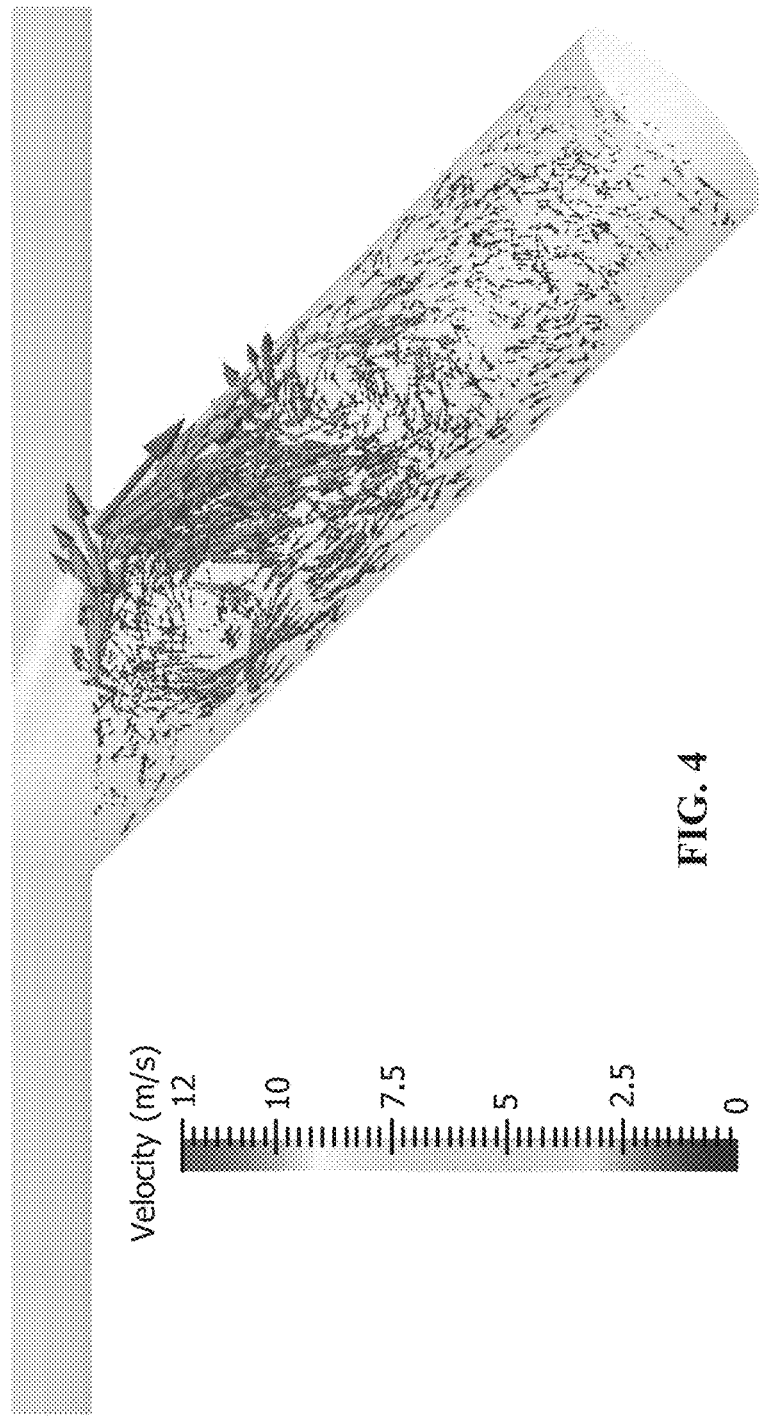
FIG. 4 shows an exemplary SCO2 system fluid velocity vector at intersection and within descending section
Figure 3:
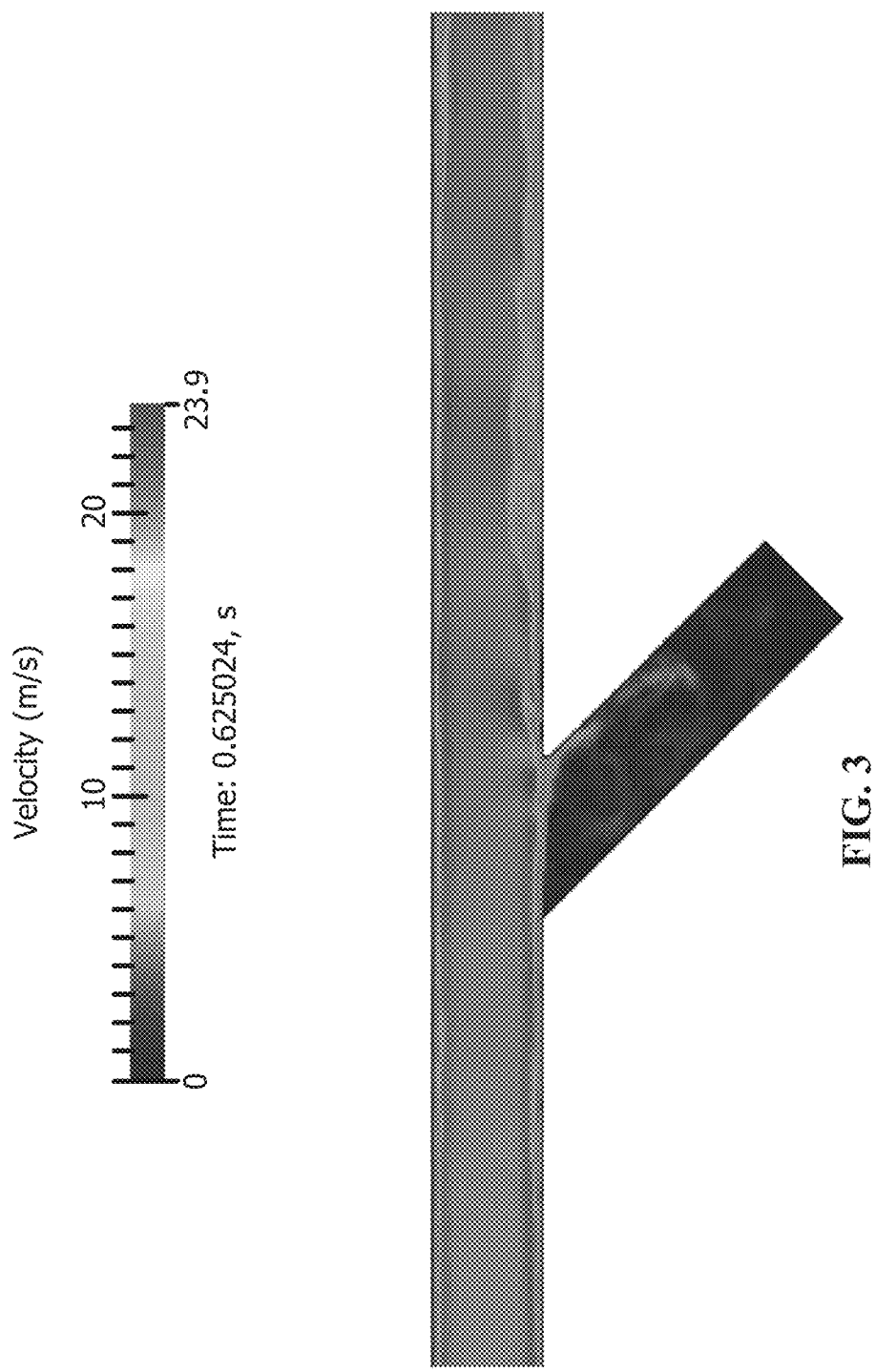
FIG. 3 shows an enlarged cross-sectional view of an exemplary y-trap indicating a fluid velocity.

FIG. 3 shows an enlarged cross-sectional view of y-trap 10 indicating a fluid velocity at 0.625 seconds. The dark gradient indicates a low fluid velocity present in the y-trap, in a range of 0-5 m/sec, as compared with process fluid velocity in straight pipe section 16, which is greater, i.e., approximately 18-23 m/sec. FIG. 4 shows fluid velocity vector arrows indicated generally as 24, at intersection 14 and within descending section 12. Rotational nature of process gas flow is evident from vector arrows 24 as fluid enters the trap 10.

The swirling motion produced by eddies generate velocity fluctuations in the descending section 12, as well as in the main stream pipe section 16. This caused an additional pressure drop concentrated in areas where swirl was highest. The pressure drop associated with y-trap section 10 was determined to be on the order of 10,000 Pa, or 1.5 psi, which is significantly less than conventional industrial y-strainers, which are estimated to have a pressure drop substantially higher than 10 psi under the same main stream conditions.

Figure 5:
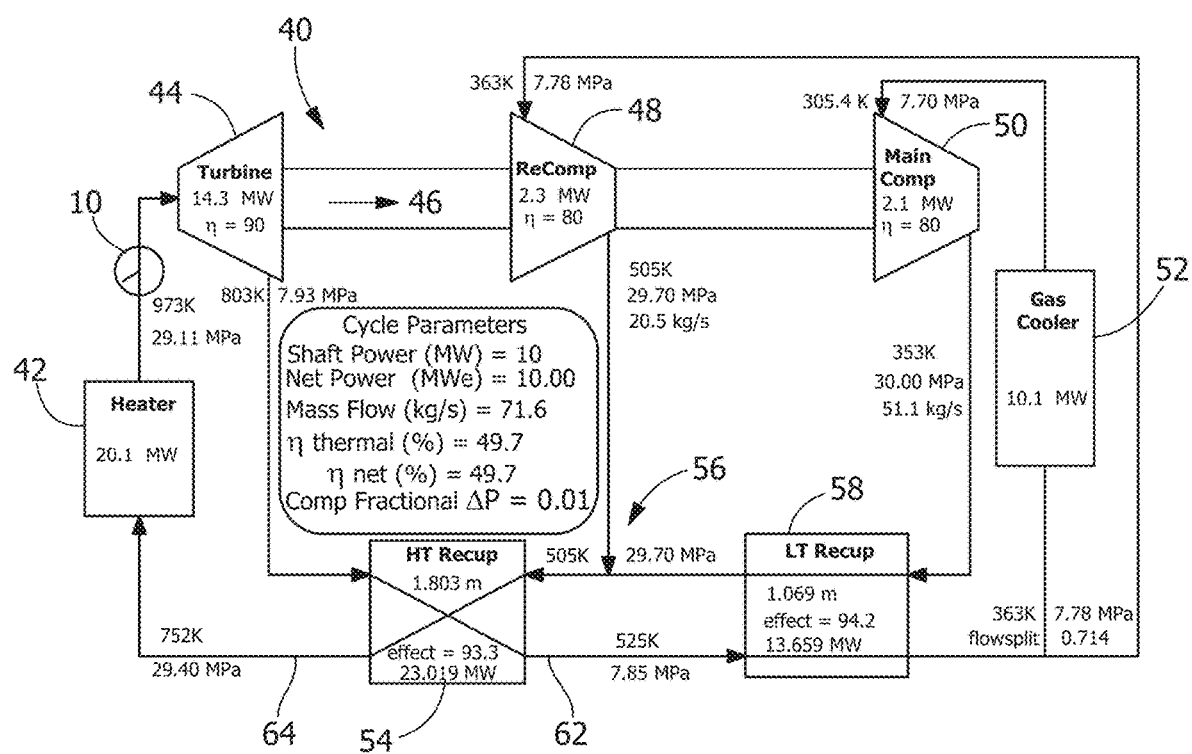
FIG. 5 shows an exemplary closed loop SCO2 process.

FIG. 5 shows an exemplary closed loop SCO2 process 40. A heater 42 receives process SCO2 and heats the fluid to supercritical parameters for input into a turbine 44, flowing first through y-pipe filter 10 of the present invention. SCO2 46 flows from turbine 44 to an input of a recompressor 48, and into a main compressor 50. Main compressor 50 receives cooled gas from gas cooler 52. Recompressor 48 recirculates a portion of the process SCO2 fluid to a high temperature (I-IT) recuperator 54, at a junction 56, in serial flow communication with a low temperature (LT) recuperator 58. Main compressor 50 discharges process SCO2 fluid 46 to an inlet of LT recuperator 58. Turbine 44 discharges a portion of SCO2 fluid to HT recuperator 54, which then discharges in a reverse path 62 to LT recuperator 58 before flowing into cooler 52 and recompressor 48. HT recuperator discharge in a forward path 64 flows to heater 42 inlet and thence again to turbine 42 via y-pipe filter 10. Y-10 may be placed at as shown at an inlet line feeding into turbine 42. Y-pipe 10 may be placed anywhere in the circuit 40, or at multiple points along the way, as appropriate for removal of contaminants. The low pressure drop associated with Y-pipe 10 acting as the filter allows for a greater number of Y-traps throughout the closed loop system, compared with in-line filters. Overall system efficiency is maintained at a high level with significantly less, nearly negligible losses.

By way of further explanation, optimal angle of θ (FIG. 2) determined to be 45° at intersection 20. As the swirl angle θ increases, there is an optimum angle at which the azimuthal, or rotational, velocity equals the axial velocity. This occurs at 45°, as noted in Equations 1 and 2 below:

$$(1A) \; S = \frac{2}{3}\tan(\theta) \quad \text{EQ. 1}$$

or the equivalent:

$$(1B) \; \theta = \tan^{-1}\left(\frac{3}{2}S\right) \quad \text{EQ. 2}$$

At 45° angle, the swirl equation is in perfect balance between axial and azimuthal flow velocity, providing swirl currents that are ideal for entraining particles using an even force both radially and axially. Equations 3 and 4 below express the azimuthal (EQ. 3) and axial (EQ. 4) velocity, respectively:

$$(2A) \; \frac{V_{\theta,0}}{V_0} = \frac{1}{\left(1+\frac{4}{9S^2}\right)^{\frac{1}{2}}} \text{ (azimuthal velocity)} \quad \text{EQ. 3}$$

$$(2B) \; \frac{V_{z,0}}{V_0} = \frac{2}{3S}\frac{1}{\left(1+\frac{4}{9S^2}\right)^{\frac{1}{2}}} \text{ (axial velocity)} \quad \text{EQ. 4}$$

For angles greater than 45°, a recirculation area called the central recirculation zone develops, inducing reverse flow in the main pipe. Reverse flow is undesirable for trapping particles and contaminants as the recirculation may interfere and oppose the knife edge swirl motion. Angles greater than 45° have higher azimuthal velocity, but the axial velocity is significantly reduced. Hence, the swirl momentum is maximized at 45°. Furthermore, swirl angles greater than 45° produce uneven swirl force, which is not optimal for collecting particles into the y-trap.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the low pressure drop advanced swirl technology gas filter as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. A media-free filter device for a supercritical fluid process comprising:
   a first pipe section connected in flow communication with a closed-loop, supercritical fluid system;
   a y-pipe segment intersecting the first pipe section at an intersection joint; the intersection joint at a descending obtuse angle with respect to the first pipe section flow direction;
   the y-pipe segment open at the intersection joint and closed opposite the intersection joint, in flow communication with the first pipe section;
   wherein the y-pipe section inducing an eddy current turbulence zone adjacent the intersection joint to remove substantially all contaminants suspended in the supercritical fluid; and wherein the contaminants are deposited in the descending y-pipe segment.

2. The device of claim 1, wherein the flow of supercritical fluid acts in a vortex shedding by generating a swirling eddy of the fluid adjacent the intersection joint.

3. The device of claim 1, wherein the contaminants removed from the supercritical fluid having a density greater than the supercritical fluid are trapped in the eddy current and deposited in the y-pipe segment.

4. The device of claim 1, wherein the eddy current being generated by contact with an angular edge formed at the intersection joint of the descending y-pipe segment in flow communication with the first pipe section.

5. The device of claim 1, wherein the supercritical fluid comprises a supercritical carbon dioxide (SCO2) fluid having a density of about 120 kg/m$^3$, a dynamic viscosity of about $5.5 \times 10^{-5}$ kg/m-s, a temperature of about 1,000° F., and a pressure of about $1.75 \times 10^7$ Pa flowing through the closed loop in the first pipe section.

6. The device of claim 1, wherein the first pipe section comprises a 3-inch schedule 160 pipe having an inside diameter of 0.0667 m, and supercritical fluid corresponds with a mass flow rate of 7.0 kilograms per second (kg/s) or 924.7 gallons per minute (gal/min).

7. The device of claim 1, wherein the supercritical fluid is turbulent, and has a Reynolds number at $2.4 \times 10^6$, and mean turbulence velocity of 16.7 m/s.

8. The device of claim 1, wherein the first pipe section having a cross-sectional diameter and a length of at least forty times the cross-sectional diameter.

9. The device of claim 1, wherein the y-pipe segment comprising a 45° y-trap located at approximately 32 pipe diameters from a first pipe section inlet.

10. The device of claim 1, wherein a low pressure drop associated with Y-pipe provides the filter for a supercritical fluid process to maintain efficiency at an increased level and negligible losses.

11. The device of claim 10, wherein the y-pipe segment allows a plurality of y-pipe segments throughout the closed loop system with reduced pressure and flow losses associated with conventional in-line filter media.

12. A closed loop SCO2 system independent of a media filter, comprising:
   a heater in flow communication with a process SCO2 fluid to heats the fluid to supercritical parameters for input into a turbine; the process SCO2 fluid flowing first through a y-pipe filter;
   a recompressor, a main compressor, a high temperature (HT) recuperator and a low temperature (LT) recuperator, connected in a closed process loop;
   the SCO2 in flow communication with the turbine flowing from turbine to an input of the recompressor and into the main compressor; and
   a gas cooler for feeding cooled gas to the main compressor;
   wherein the recompressor recirculates a portion of the process SCO2 fluid to the high temperature (HT) recuperator at a junction, in serial flow communication with the low temperature (LT) recuperator; the main compressor discharges process SCO2 fluid to the LT recuperator; the turbine discharges a portion of SCO2 fluid to HT recuperator in a reverse path to LT recuperator;
   the HT recuperator discharge in a forward path to heater inlet and thence to the y-pipe filter at an inlet to turbine; and
   wherein the y-pipe filter comprises:
   a first pipe section connected in flow communication with the closed loop SCO2 system;

a y-pipe segment intersecting the first pipe section at an intersection joint; the intersection joint at a descending obtuse angle with respect to the first pipe section flow direction;

the y-pipe segment open at the intersection joint and closed opposite the intersection joint, in flow communication with the first pipe section;

wherein the y-pipe section inducing an eddy current turbulence zone adjacent the intersection joint to remove substantially all contaminants suspended in the SCO2 fluid;

and wherein the contaminants are deposited in the descending y-pipe segment.

13. The process of claim 12, wherein the Y-pipe filter is located at any point in the closed loop.

14. The process of claim 12, wherein the Y-pipe filter comprises a plurality of Y-pipe filters, wherein the plurality of Y-pipe filters being located in serial flow communication at multiple points in the closed loop, for removal of contaminants.

15. The process of claim 1, wherein the eddy current being generated by contact with an angular edge formed at the intersection joint of the descending y-pipe segment in flow communication with the first pipe section.

16. The process of claim 1, wherein the first pipe section having a cross-sectional diameter and a length of at least forty times the cross-sectional diameter.

17. The process of claim 1, wherein the y-pipe section comprising a 45° y-trap located at approximately 32 pipe diameters from a first pipe section inlet.

18. The device of claim 1, wherein a low pressure drop associated with Y-pipe provides the filter for a supercritical fluid process to maintain efficiency at an increased level and negligible losses.

* * * * *